Jan. 5, 1960

P. J. CAPUTO ET AL 2,919,661

CONTAINER CARS

Filed Feb. 13, 1956

Paul J. Caputo
John A. Johnson
*INVENTORS*

BY
*Robert A. Shield*
ATTORNEY

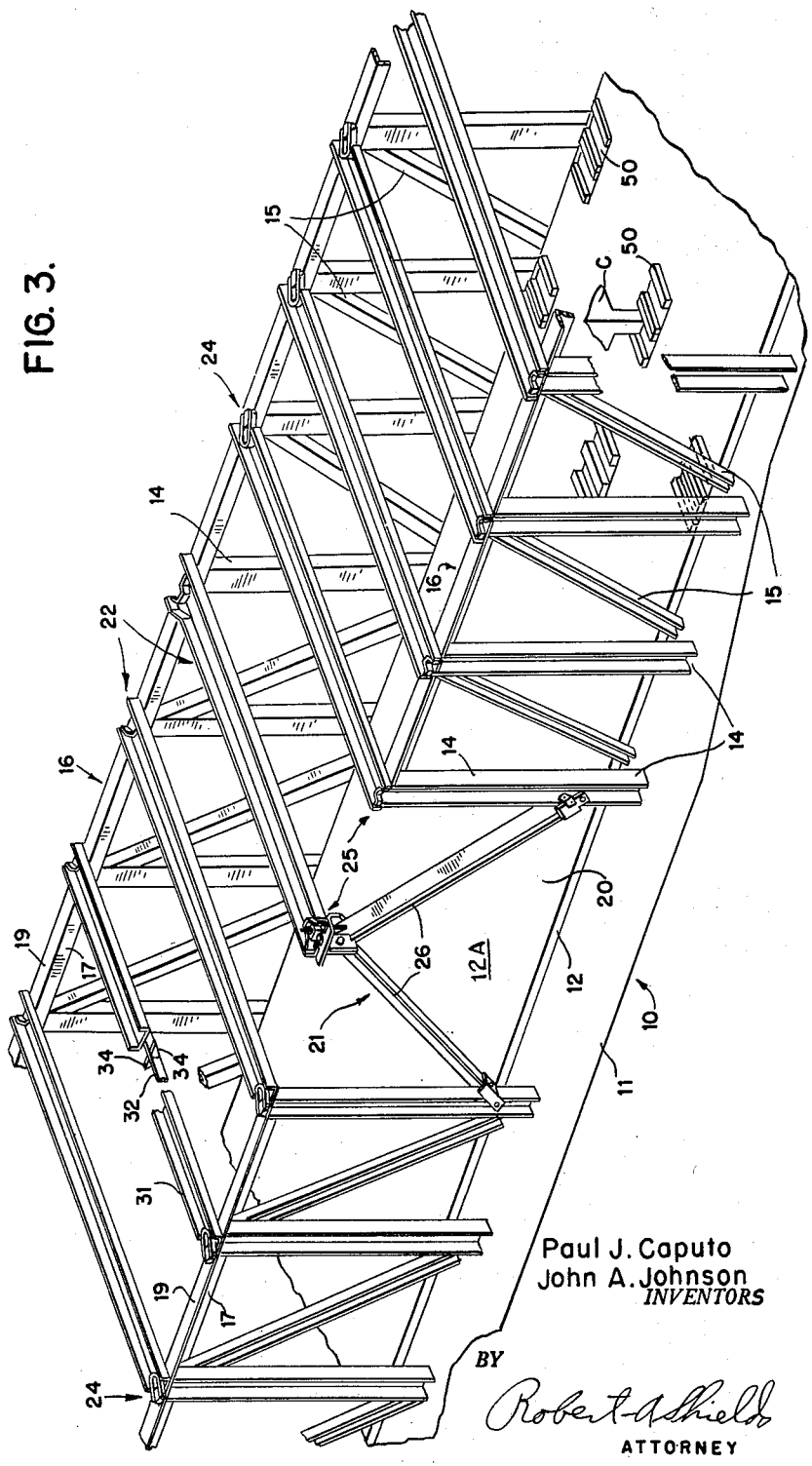

Jan. 5, 1960 P. J. CAPUTO ET AL 2,919,661
CONTAINER CARS
Filed Feb. 13, 1956 5 Sheets-Sheet 5

Paul J. Caputo
John A. Johnson
INVENTORS

BY
Robert A. Shield
ATTORNEY

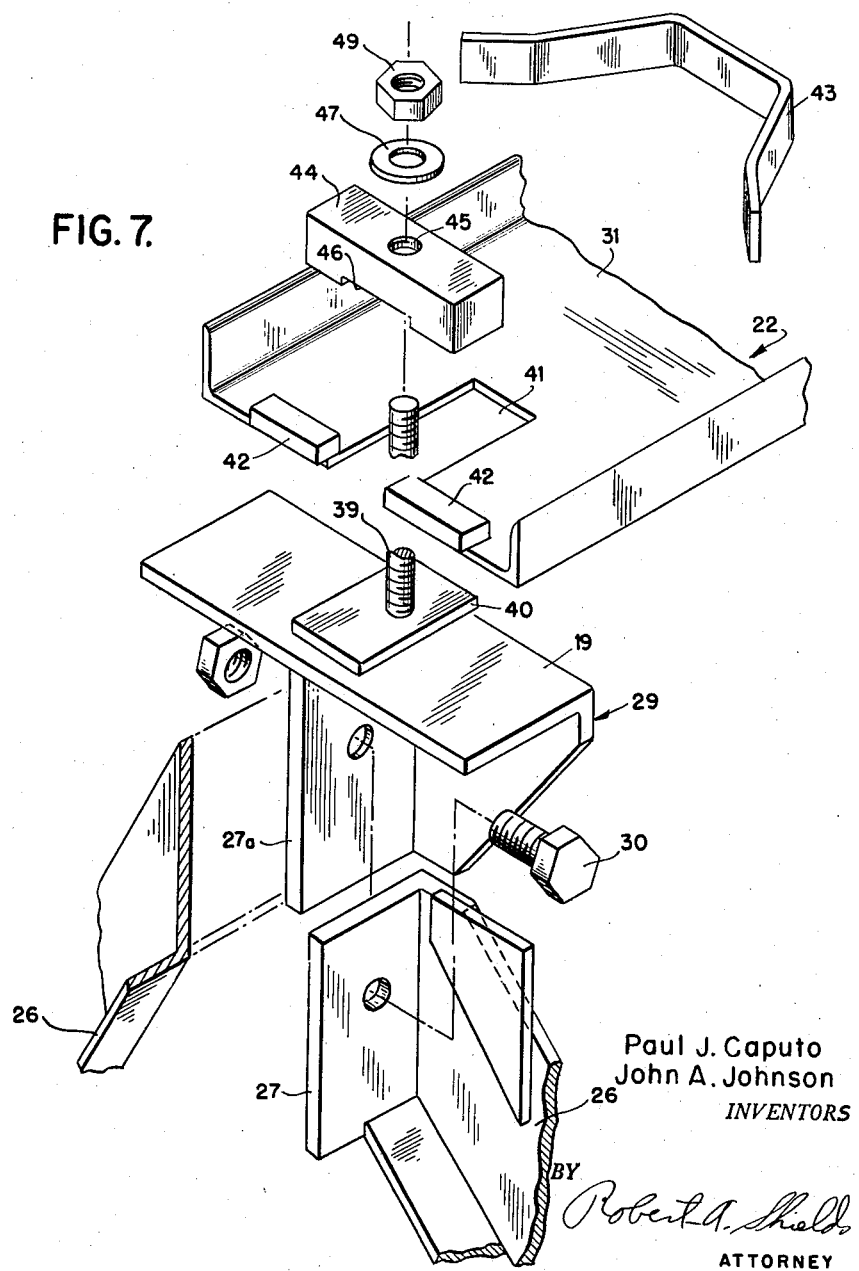

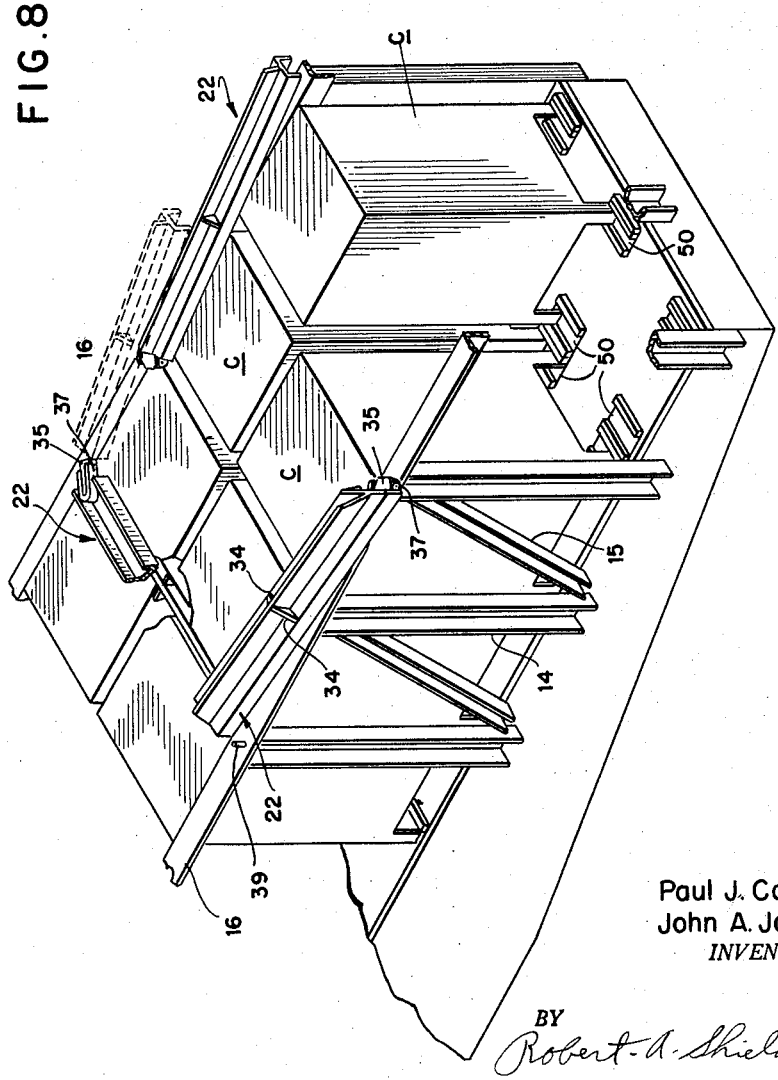

United States Patent Office 2,919,661
Patented Jan. 5, 1960

2,919,661
CONTAINER CARS

Paul J. Caputo, Brooklyn, N.Y., and John A. Johnson, Short Hills, N.J., assignors to ACF Industries, Incorporated, New York, N.Y., a corporation of New Jersey Application February 13, 1956, Serial No. 565,193

10 Claims. (Cl. 105—366)

This invention relates to railway freight cars, and, more particularly, to freight cars of the type in which a plurality of separate freight containers are carried.

Heretofore, it has been proposed to construct freight container cars for transporting bulk goods, such as flour, chemicals and other powdered or granular products, in which the containers were loaded and unloaded by cranes or in which the car side frames consisted of a plurality of adjacent drop gates for side loading and unloading. Crane loading and unloading involves a high initial investment and operating cost, a relatively large labor force and frequent damage to containers and goods, while drop gate cars, which frequently include internal bulkheads, are expensive and cumbersome in use. As an alternative, bulk goods were often shipped in bags, drums or in loose bulk loads subject to mechanical damage, deterioration and contamination through exposure.

Accordingly, an object of the present invention is to provide a freight container car which is not subject to the foregoing difficulties or disadvantages.

Another object is to provide such a car in which a plurality of separate containers may be loaded and unloaded in a relatively short period of time.

Another object is to provide such a car which may be efficiently loaded and unloaded by a relatively small labor force.

Another object is to provide such a car which can be loaded and unloaded without interfering with operations on adjacent tracks or highways or with overhead structures.

A further object is to provide such a car wherein damage and deterioration to goods in transit is reduced to a minimum.

A still further object is to provide such a car which is relatively simple, compact and rugged in construction, reliable in operation and economical to manufacture.

Other and further objects of the invention will be obvious upon an understanding of the illustrative embodiment about to be described or will be indicated in the appended claims, and various advantages not referred to herein will occur to one skilled in the art upon employment of the invention in practice.

In accordance with the invention, the foregoing objects may be accomplished by providing a freight container car having side frames and a side rail extending longitudinally of the car along the top of each of the side frames, bar means pivotally mounted on one of the side rails and extending transversely of the car to divide the same into container supporting sections, and securing means associated with the bar means and the other of the side rails for releasably securing the bar means to the other side rail.

A preferred embodiment of the invention has been chosen for purposes of illustration and description, and is shown in the accompanying drawings forming a part of the specification, wherein:

Fig. 3 is a fragmentary perspective view of the car shown in Figs. 1 and 2 illustrating bar members extending transversely of the car;

Fig. 7 is an exploded perspective view of the elements illustrated in Fig. 6; and Fig. 8 is a fragmentary perspective view illustrating two adjacent bar members in longitudinal position, as well as the relationship of several containers to a car of the present invention.

Figure 1:
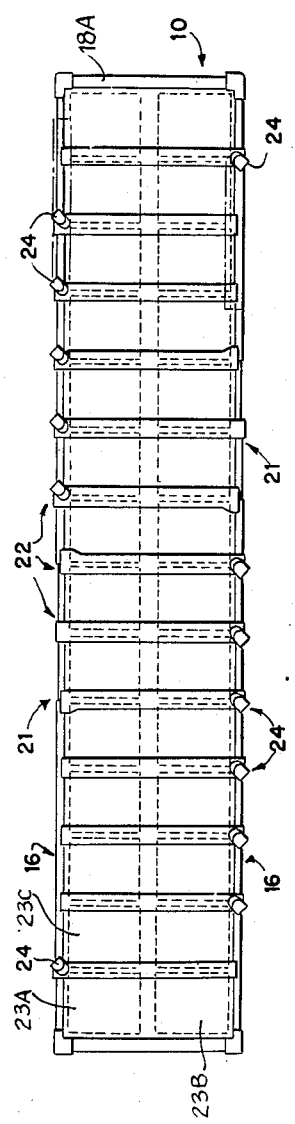
Fig. 1 is a top plan view of a freight container car in accordance with the present invention.
Figure 2:
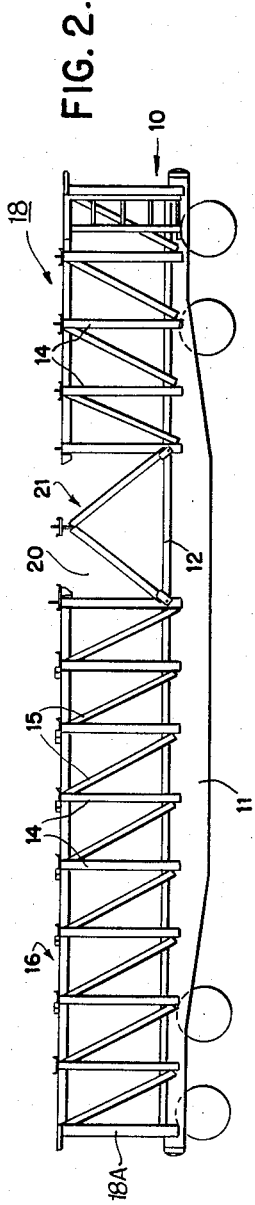
Fig. 2 is a side elevational view of the car shown in Fig. 1.

Referring to the drawings in detail, and, more particularly, to Figs. 1, 2 and 3 thereof, there is shown a freight container car 10 of the gondola type having the usual side sills 11 and a floor 12. By reason of the within invention, and in contrast to drop side container cars embodying permanent laterally extending partitions, said floor 12 presents a substantially smooth and even upper surface 12A extending substantially continuously from end to end and from side to side of the car and free of obstacles to movement of freight in any desired direction substantially throughout its area. To the side sills 11 are secured vertical posts 14 and diagonal braces 15, the upper ends of which are attached to the upper ends of the posts to serve as supports for longitudinal angle members 16 which are mounted thereon to provide top side plates or rails having inner depending flanges 17 and upper horizontal flanges 19. The angle members 16, together with the posts 14, the braces 15 and the side sills 11 form trusses which constitute the side frames 18 connected in conventional manner to end frames 18A of the car.

Each of the side frames is interrupted along its length to provide door openings 20, for which closure means 21 are provided. For a purpose which will subsequently be made clear, and as best seen in Figure 1, it is preferred that these door openings 20 be staggered or completely offset longitudinally of the car with respect to each other, so that no portion of either opening 20 is directly, that is to say perpendicularly, across the car from any portion of the other opening. As best illustrated in Figs. 2 and 3, each door opening 20 is defined solely by framing structure constituted by the adjacent posts 14 which serve as door posts therefor, and by the subjacent portion of sill 11, and is devoid of rigid structure at the top.

Fig. 3 shows a plurality of bars 22 in their normal position extending transversely of the car at the top thereof and between the top side rails or angle members 16. As best seen in Fig. 1, car 10 is thus divided into twenty-eight sections, 23A, 23B, 23C, etc., each section adapted to contain a container C and to secure the same against movement relative to the car. Each bar 22 is pivotally mounted, at one end thereof, by a hinge 24 on one of the side rails, and is locked by suitable securing means 25, at its free end, to the other side rail or, if a particular bar happens to overlie a door opening, to the top of the closure means 21 provided therefor. In the latter case, the bar 22 acts to secure the top of means 21 against movement lateral of the car.

Figure 6:
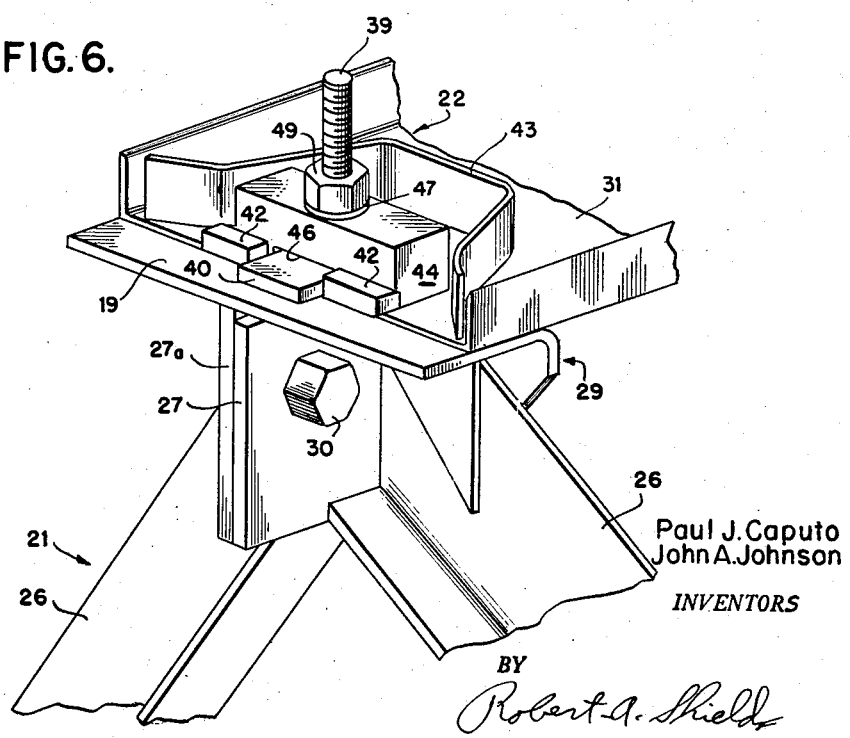
Fig. 6 is a fragmentary perspective view illustrating securing means associated with a bar member and a car side rail.

The door closure means 21 for each door includes a pair of elongated diagonal members 26, each of which is pivotally connected, at one end thereof, to the lower portion of one of the posts 14 adjacent a door opening. The pivotal axes of these connections are such that each member 26 may be rotated thereabout from a position parallel with and contiguous with its respective post to the diagonal position shown, whereby the free ends thereof come together at the top central portion of the opening, that is to say, midway between the door posts 14. To provide a suitable union, the upper or free ends of the diagonal members 26 are mitered and each mitered surface has secured thereon a face plate 27, 27a, as shown in Figs. 6 and 7. One of these face plates, 27a for example, is longer than the other and extends upwardly slightly above the uppermost level of the other face plate. A saddle member 29 of angle bar is welded to the upper surface of the longer face plate and serves as a discontinuous extension of the top side rail or angle member 16 on that side of the car, the flanges of saddle 29 being substantially in the planes of the respective flanges of rail 16. Each of the face plates 27, 27a is provided with a bolt hole, which holes come into registry one with the other when the members 26 are brought together to receive a locking bolt 30.

Figure 4:
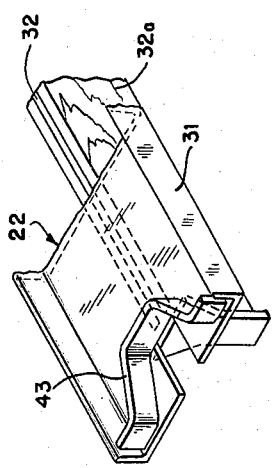
Fig. 4 is a fragmentary perspective view illustrating a portion of one of the bar members.

The bars 22, as has been stated, normally extend transversely of the top of the car and between the top side rails or angle members 16. As shown in Figs. 3 and 4, these bars include channel members 31 having their side flanges extending upwardly and having a depending rib 32 welded to the central portion of the web and braced by gusset plates 34 secured to the sides of the ribs 32 and to the bottom or web of the channel members 31. Wood or other resilient strips 32a are attached in any suitable manner to the sides of ribs 32.

Figure 5:
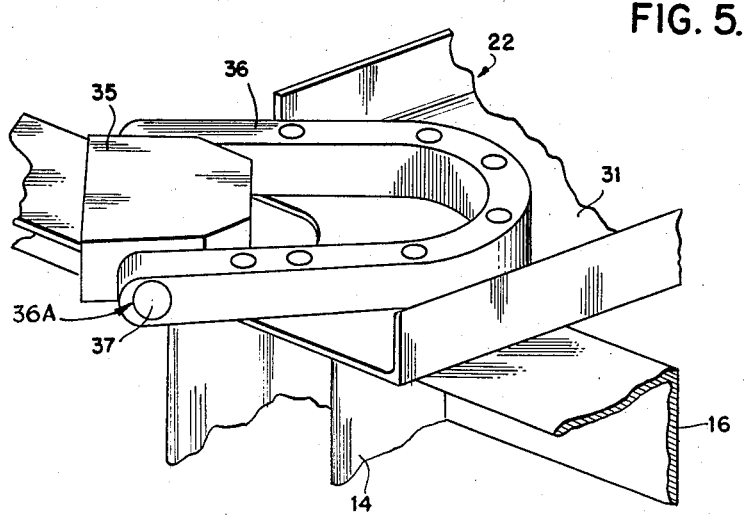
Fig. 5 is a fragmentary perspective view illustrating a portion of one of the bar members pivotally mounted on a side rail.

As best illustrated in Fig. 5, each of the hinges 24 comprises a block 35 secured to a flange 19 and having a bore therethrough and a U-shaped leaf or hinge plate 36 having bores 36A extending transversely through the free ends of its legs. The leaf or hinge plate 36 is pivotally secured to the block 35 by a hinge pin 37 extending through the bores in the legs of the leaf and in the block. The looped end of the leaf is secured to one end of one of the bars 22 to enable the same to be rotated about the axis of the hinge pin 37. It will be noted that the axes of the pins 37 are disposed at an angle of approximately 45° to the longitudinal axes of the side rail 16 and of the car 10, while the longitudinal axes of the bars 22 in their crosswise operative position illustrated in Figs. 3 and 5 are perpendicular to the axes of the car and of the side rails but at a 45° angle to the pin axes. This allows the bars to pivot through 180° from a transverse to a longitudinal position without projecting any great height above the car, the maximum height above the car to be reached by the unhinged ends of the bars being less than their length. It will thus be seen that the bars in swinging through a 180° arc will subtend a 90° or right angle between the crosswise or operative position and the longitudinal or inoperative position. It will further be seen that the plane of the axis of pivot pin 37 bisects the included ninety degree angle between the two positions of the bar. Should it be desired that bars 22 extend crosswise between rails 16 otherwise than perpendicularly to said rails so as to subtend an angle other than ninety degrees between their operative and inoperative positions, then the axes of pins 37 will be disposed to bisect said other angle rather than the ninety degree included angle illustrated.

The securing means 25 may consist simply of a series of upwardly extending, bolts 39 (Fig. 6) permanently mounted in the side rails 16 and spaced to receive suitable recesses in the unhinged ends of the bars 22. After the bolts have thus received the bars 22, the latter may be locked thereto by suitable lock nuts. Figs. 6 and 7 illustrate such an arrangement wherein the sections 29 atop the door opening closure means 21 are adapted to receive bar 22. The horizontal flange 19 of the section 29 or of the rail 16 is provided with a block 40 secured thereto and which serves to anchor the bolt 39. An open ended, block receiving recess 41 is provided in the unhinged end of the bar 22 adapted to receive and straddle the block 40. A pair of guide blocks 42 are mounted on the bar 22 adjacent the open end of the recess 41 and a locking block 44, formed with a through bolt-receiving bore 45 and a bottom recess 46, is adapted to be positioned across the recess 41 inwardly of the car relative to and contiguous to the guide blocks 42. The locking block recess 46 receives the block 40 and the bolt 39 passes through the bore 45 to receive washer 47 and nut 49. A suitable tie 43 may be secured to the bar 22 between its flanges and adjacent the recess 41 for added strength. Such an arrangement maintains the bar 22 securely fastened to the side rail 16 or side rail section 29, as the case may be, and minimizes relative movement therebetween and consequent noise and wear.

In the preferred construction, as shown in Fig. 1, the transverse bars 22 may rotate about their respective hinge axes which are at a 45° angle of inclination to the vertical plane of the longitudinal axes of the bars and to the longitudinal axis of the vertical plane of the side rails 16, so that when it is desired to load or unload the car, the bars may be unlocked at their unhinged ends and rotated to a position whereby they overlie the side rails to which they are hinged and in the vertical plane of the latter whereupon adjacent bars may be stacked one upon the other. In this position they are out of the way of loading or unloading operations and cannot interfere with any overhead apparatus such as crane booms, electrical wiring, or the like, and at the same time, the bars will not obstruct trains passing on other tracks and will permit the car to be brought up close to warehouse walls, and the like. Due to the fact that the pivot pin 37 of each bar 22 has its axis fixed relative to car 10 and is engaged by the spaced apart bores 36A in the legs of hinge plate 36, the bar 22 is positively guided through a fixed path of swinging between its crosswise and longitudinal positions of rest and vice versa, thus facilitating operation. Furthermore, the bars 22 cannot fall off the top of rail 16 nor even be pushed off, nor become unstacked. Their only possible movement from longitudinal position of rest is through their respective fixed path of swinging back to crosswise position of rest.

In order that the bars, when folded back, will not interfere with the door openings, the hinged joints are so arranged that any bar within a bar's length of a door opening is either hinged to fold away from the door opening or is hinged at the side of the car opposite that door opening. Similarly, in order to prevent excessive overhang at the ends of the car, the bars adjacent the ends thereof are hinged to pivot away from the car ends, all as shown in Fig. 1.

In operation, in order to load a car of the type contemplated herein, the bolts 30 are removed from the face plates of the door closure means 21 and the nuts 49 are removed from the bolts 39. The bars 22 are then rotated to open position overlying and paralleling the side rails to which they are hinged, and the diagonal members 26 of the door closure means are swung to a vertical position contiguous to the posts 14 to which they are hinged. The containers C to be transported may then be loaded by a fork lift, for example, by placing them in proper position in the car, the floor of which may be marked for that purpose; or if the containers are of the type having supporting feet thereunder, the car floor 12 may be provided with foot receiving pockets or recesses 50 (Figs. 3).

When the car is loaded, the diagonal members 26 are swung into door closing position and are bolted together by bolts 30. Bars 22 are then rotated into their normal position transverse of the car and are locked to the side rails 16, or side rail sections 29, by the application of locking blocks 44, washers 47 and nuts 49 to the bolts 39.

The unloading operation is performed in similar fashion except that the containers are removed from the car.

It will be noted that when the containers are properly positioned in the car and the bars 22 rotated into normal position transverse of the car, the ribs 32 depending therefrom with the resilient strips 32a fit between the uppermost portions of longitudinally adjacent containers to hold the same against longitudinal movement with respect to the car. Similarly, the gusset plates 34 fit between the uppermost corner portion of laterally adjacent containers to hold the same against lateral movement with respect to the car. It will also be noted that the door openings in the side frames are staggered with respect to each other in order that the bars 22 which are releasably secured to the tops of the door opening closure means may be pivotally mounted on an uninterrupted portion of the opposite side rail.

From the foregoing description, it will be seen that the present invention provides a relatively simple, compact and rugged freight container car which is reliable in operation, economical to manufacture and which may be efficiently loaded and unloaded in a short time by a labor force as small as one man. It will also be seen that the car may be loaded and unloaded without interfering with operations on adjacent tracks or highways or with overhead structures and that damage and deterioration to goods in transit is reduced to a minimum.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. In a freight container car having side frames, each of said side frames comprising a side rail extending longitudinally of said car along the top of said frame, the improvement comprising a multiplicity of bars, means pivotally connecting each of said bars to the top of one of said side rails, each of said bars extending transversely of said car to the other of said side rails and detachably connected to the latter, each said bar being swingable about its pivotal connection from transverse position to a position extending longitudinally of said car and above and in the vertical plane of the rail to which it is pivotally connected, said means guiding each of said bars between said two positions and permitting the retaining of said bars in said vertical plane.

2. In a freight container car having side frames, each of said side frames comprising a side rail extending longitudinally of said car along the top of said frame, the improvement comprising a multiplicity of bars, each bar having a free end and a hinge element fixedly mounted on the other of its ends, a hinge element for each bar fixedly mounted on top of one of said side rails, a pivot pin extending through one bar mounted hinge element and through one rail mounted hinge element, each bar thereby being pivotally mounted on top of one of said side rails, each bar further extending transversely of said car from the rail on which it is mounted to the other rail and being detachably connected to said other rail, the pivotal mounting of each said bar providing means guiding the movement of the bar from its transverse position to a position extending longitudinally of said car and above and in the vertical plane of said rail on which it is mounted.

3. In a freight container car having side frames, each of said side frames comprising a side rail extending longitudinally of said car along the top of said frame, the improvement comprising a multiplicity of bars, each bar having a free end and a hinge element fixedly mounted on the other of its ends, a hinge element for each bar fixedly mounted on top of one of said side rails, a pivot pin having a pivotal axis and extending through one bar mounted hinge element and through one rail mounted hinge element, each bar thereby being pivotally mounted on top of one of said side rails, each bar further extending transverse of said car from the rail on which it is mounted to the other rail and being detachably connected to said other rail, and said pivotal axis of said pivot pin of each bar being disposed in a vertical plane bisecting the angle subtended by the vertical plane of the longitudinal axis of the respective bar in transverse position and said last mentioned bar in a position longitudinal of said car and overlying the side rail to which it is connected and in the vertical plane of said side rail, whereby said last mentioned bar is swingable in a fixed path through substantially one hundred eighty degrees from crosswise position to said longitudinal position.

4. In a freight container car having side frames, each of said side frames comprising a side rail extending longitudinally of said car along the top of said frame, the improvement comprising a multiplicity of bars, each bar having a free end and a hinge element fixedly mounted on the other of its ends, a hinge element for each bar fixedly mounted on top of one of said side rails, a pivot pin having a pivotal axis and extending through one bar mounted hinge element and through one rail mounted hinge element, each bar thereby being pivotally mounted on top of one of said side rails, each bar further extending perpendicularly across said car from the rail on which it is mounted to the other rail and being detachably connected to said other rail, and said pivotal axis of said pivot pin of each bar being disposed at an angle of forty-five degrees to the vertical plane of the longitudinal axis of the respective bar and to the vertical plane of the respective side rail, whereby each bar is positively guided through a fixed path of swinging through substantially one hundred eighty degrees between crosswise position and a longitudinal position overlying and in the vertical plane of the respective side rail.

5. In a freight container car, the combination with end frames of side frames connected to said end frames, said side frames comprising side sills, side rails, and posts and braces extending between said sills and rails and operatively supporting said rails from said sills, said side rails extending continuously throughout the greater part of the distance between said end frames and at least one of said side rails being interrupted to provide a door opening in said side frame, said opening being defined solely by two of said posts and by a subjacent portion of said sill and being devoid of rigid structure at its top, a plurality of bars, means pivotally connecting each of said bars to the top of one of said side rails, each of bars extending transversely of said car to the other of said side rails and detachably connected thereto, said bars being swingable from said transverse position to a position extending longitudinally of said car and above and in the vertical plane of said side rails, said means guiding each of said bars between said two positions and permitting the retaining of said bars in said vertical plane.

6. In a freight container car, the combination with end frames of side frames connected to said end frames, said side frames comprising side sills, side rails, and posts and braces extending between said sills and rails and operatively supporting said rails from said sills, said side rails extending continuously throughout the greater part of the distance between said end frames and at least one of said side rails being interrupted to provide a door opening in said side frame, said opening being defined solely by two of said posts and by a subjacent portion of said sill and being devoid of rigid structure at its top, a plurality of bars, means pivotally connecting each of said bars to the top of one of said side rails, each of said bars extending transversely of said car to the other of said side rails and detachably connected thereto, said bars being swingable from said transverse position to a position extending longitudinally of said car and above and in the vertical plane of said side rails, said means guiding each of said bars between said two positions and retaining said bars in said vertical plane, said car further having a floor presenting a substantially smooth and even upper surface extending substantially continuously between said side and said end frames and free of obstacles to movement of freight in any desired direction substantially throughout its area.

7. In a freight container car, the combination with end frames of side frames connected to said end frames, said side frames comprising side sills, side rails, and posts and braces extending between said sills and rails and operatively supporting said rails from said sills, said side rails extending continuously throughout the greater part of the distance between said end frames and at least one of said side rails being interrupted to provide a door opening in said side frame, said opening being defined solely by two of said posts adjacent each other and serving as door posts and by a subjacent portion of said sill and being devoid of rigid structure at its top, a plurality of bars, means pivotally connecting each of said bars to the top of one of said side rails, each of said bars extending transversely of said car to the other of said side rails and detachably connected thereto, said bars being swingable from said transverse position to a position extending longitudinally of said car and above and in the vertical plane of said side rails, said means guiding each of said bars between said two positions and retaining said bars in said vertical plane, and closure means for said door opening, said closure means comprising an elongated member pivotally connected at one of its ends to one of said door posts adjacent an end of the latter on each side of said opening, said member being swingable from a position substantially parallel with its connected post to a diagonal position in which the free ends of said two members meet substantially midway between said two door posts, said closure means further comprising means securing said two free ends against movement lateral of said car.

8. In a freight container car, the combination with end frames of side frames connected to said end frames, said side frames comprising side sills, side rails, and posts and braces extending between said sills and rails and operatively supporting said rails from said sills, said side rails extending continuously throughout the greater part of the distance between said end frames and at least one of said side rails being interrupted to provide a door opening in said side frame, said opening being defined solely by two of said posts adjacent each other and serving as door posts, and by a subjacent portion of said sill and being devoid of rigid structure at its top, a plurality of bars each pivotally connected to the top of one of said side rails and extending transversely of said car to the other of said side rails and detachably connected thereto, said bars being swingable from said transverse position to a position extending longitudinally of said car and above and in the vertical plane of said side rails, means retaining said bars in said vertical plane, and closure means for said door opening, said closure means comprising an elongated member pivotally connected at one of its ends to one of said door posts adjacent the lower end of the latter on each side of said opening, said member being swingable from a position substantially parallel with its connected post to a diagonal position in which the free ends of said two members meet substantially midway between said two door posts and adjacent the horizontal plane of said interrupted side rail, and one of said bars being pivotally connected to the top of the other side rail and detachably connected to said two free ends.

9. In a freight container car, the combination with end frames of side frames connected to said end frames, said side frames comprising side sills, side rails, and posts and braces extending between said sills and rails and operatively supporting said rails from said sills, said side rails extending continuously throughout the greater part of the distance between said end frames and at least one of said side rails being interrupted to provide a door opening in said side frame, said opening being defined solely by two of said posts adjacent each other and serving as door posts, and by a subjacent portion of said sill and being devoid of rigid structure at its top, a plurality of bars each pivotally connected to the top of one of said side rails and extending transversely of said car to the other of said side rails and detachably connected thereto, said bars being swingable from said transverse position to a position extending longitudinally of said car and above and in the vertical plane of said side rails, means retaining said bars in said vertical plane, and closure means comprising an elongated member pivotally connected at one of its ends to one of said door posts adjacent the lower end of the latter on each side of said opening, said member being swingable from a position substantially parallel with its connected post to a diagonal position in which the free ends of said two members meet substantially midway between said two door posts and adjacent the horizontal plane of said interrupted side rail, a saddle member connected to the upper end of one of said elongated members and extending in said horizontal plane of said interrupted side rail, and one of said bars being pivotally connected to the top of the other side rail directly across said car from saddle member and extending between said other side rail and said saddle member and means detachably connecting said last mentioned bar to said saddle member.

10. In a freight container car, the combination with end frames of side frames connected to said end frames, said side frames comprising side sills, side rails, and posts and braces extending between said sills and rails and operatively supporting said rails from said sills, said side rails extending continuously throughout the greater part of the distance between said end frames and at least one of said side ralis being interrupted to provide a door opening in said side frame, said opening being defined solely by two of said posts and by a subjacent portion of said sill and being devoid of rigid structure at its top, a plurality of bars, means pivotally connecting each of said bars to the top of one of said side rails, each of said bars extending transversely of said car to the other of said side rails and detachably connected thereto, said bars being swingable from said transverse position to a position extending longitudinally of said car and above and in the vertical plane of uninterrupted portions of said side rails, said means guiding each of said bars between said two positions and retaining said bars in said vertical plane, whereby said door opening is unobstructed by said bars.

References Cited in the file of this patent

UNITED STATES PATENTS

| | | |
|---|---|---|
| Re. 19,815 | Woodruff | Jan. 7, 1936 |
| 1,449,302 | Smith | Mar. 20, 1923 |
| 1,840,927 | Woodruff | Jan. 12, 1932 |
| 1,853,594 | Woodruff | Apr. 12, 1932 |
| 2,501,420 | Steins | Mar. 21, 1950 |
| 2,513,348 | Nampa | July 4, 1950 |